(12) United States Patent
Gurel et al.

(10) Patent No.: US 9,588,516 B1
(45) Date of Patent: Mar. 7, 2017

(54) UNMANNED AERIAL VEHICLE VISUAL LINE OF SIGHT CONTROL

(71) Applicant: Unmanned Innovation Inc., San Francisco, CA (US)

(72) Inventors: Volkan Gurel, San Francisco, CA (US); Bernard J. Michini, Walnut Creek, CA (US); Edward Dale Steakley, Cupertino, CA (US)

(73) Assignee: Unmanned Innovation Inc., San Francisco, CA (US)

( * ) Notice: Subject to any disclaimer, the term of this patent is extended or adjusted under 35 U.S.C. 154(b) by 0 days.

(21) Appl. No.: 15/094,802

(22) Filed: Apr. 8, 2016

Related U.S. Application Data

(60) Provisional application No. 62/298,429, filed on Feb. 22, 2016, provisional application No. 62/292,783, filed on Feb. 8, 2016.

(51) Int. Cl.
    *G05D 1/00*     (2006.01)
    *G05D 1/02*     (2006.01)

(52) U.S. Cl.
    CPC ......... *G05D 1/0033* (2013.01); *G05D 1/0061* (2013.01); *G05D 1/0274* (2013.01)

(58) Field of Classification Search
    CPC ... G05D 1/0033; G05D 1/0061; G05D 1/0274
    See application file for complete search history.

(56) References Cited

U.S. PATENT DOCUMENTS

| | | | |
|---|---|---|---|
| 9,127,908 B2 * | 9/2015 | Miralles | F41G 7/008 |
| 2004/0249519 A1 * | 12/2004 | Frink | B64D 45/0015 |
| | | | 701/3 |
| 2008/0033604 A1 * | 2/2008 | Margolin | G05D 1/0044 |
| | | | 701/2 |
| 2009/0125223 A1 * | 5/2009 | Higgins | G06T 7/2033 |
| | | | 701/532 |
| 2010/0198514 A1 * | 8/2010 | Miralles | F41G 7/008 |
| | | | 701/302 |
| 2011/0147515 A1 * | 6/2011 | Miller | B64C 39/028 |
| | | | 244/63 |
| 2014/0371952 A1 * | 12/2014 | Ohtomo | G05D 1/101 |
| | | | 701/2 |
| 2015/0062339 A1 * | 3/2015 | Ostrom | H04N 7/185 |
| | | | 348/144 |
| 2015/0230150 A1 * | 8/2015 | Wang | H04B 7/18506 |
| | | | 370/252 |

(Continued)

*Primary Examiner* — Thomas G Black
*Assistant Examiner* — Peter D Nolan
(74) *Attorney, Agent, or Firm* — Fish & Richardson P.C.

(57) ABSTRACT

Methods, systems and apparatus, including computer programs encoded on computer storage media for unmanned aerial vehicle visual line of sight flight operations. A UAV computer system may be configured to ensure the UAV is operating in visual line of sight of one or more ground operators. The UAV may confirm that it has a visual line of sight with the one or more user devices, such as a ground control station, or the UAV may ensure that the UAV does not fly behind or below a structure such that the ground operator would not be able to visually spot the UAV. The UAV computer system may be configured in such a way that UAV operation will maintain the UAV in visual line of sight of a base location.

29 Claims, 8 Drawing Sheets

(56) References Cited

U.S. PATENT DOCUMENTS

2016/0025457 A1\* 1/2016 Miralles .................. F41G 7/008
  701/3
2016/0068267 A1\* 3/2016 Liu ....................... B64C 39/024
  701/11

\* cited by examiner

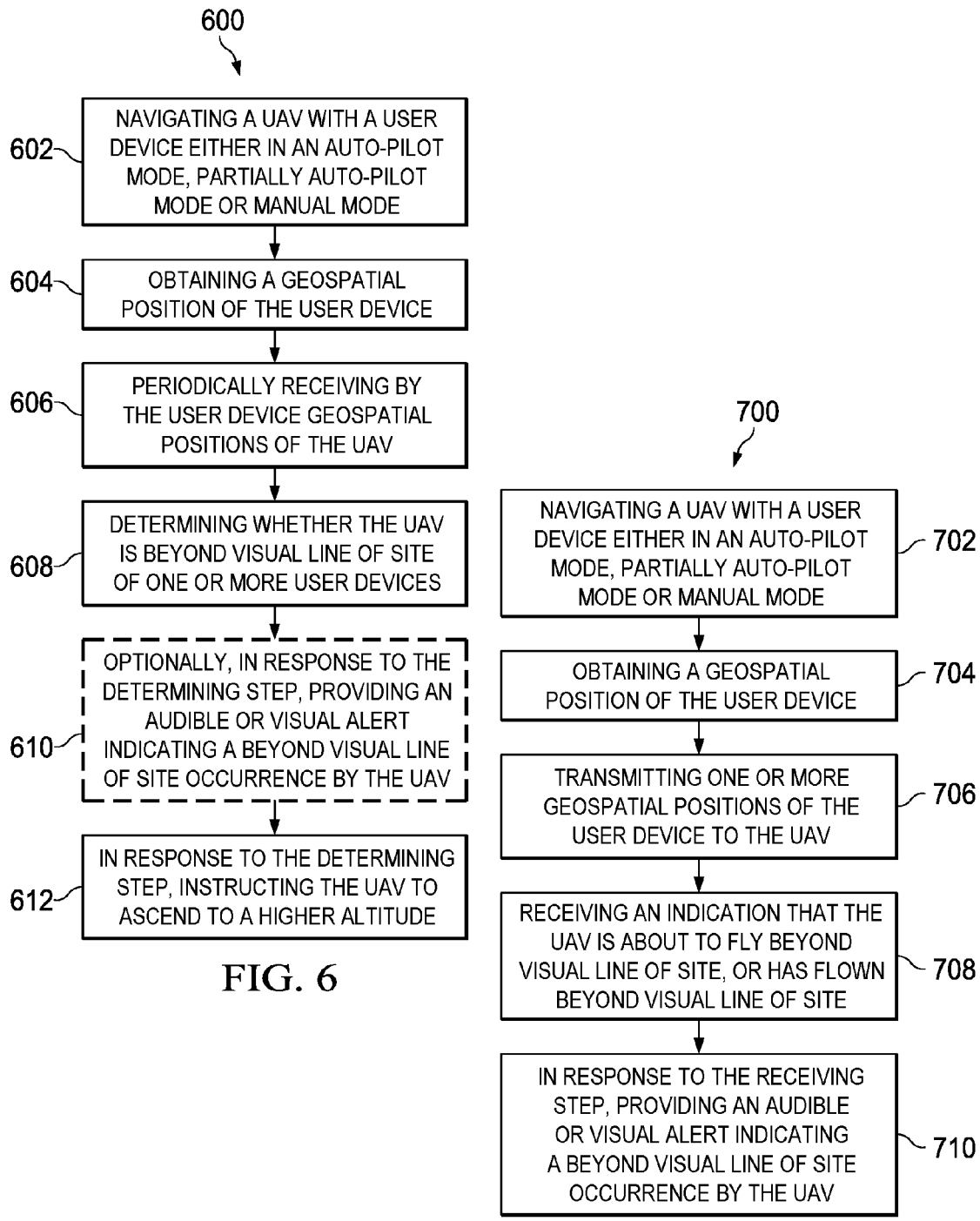

UNMANNED AERIAL VEHICLE VISUAL LINE OF SIGHT CONTROL

CROSS-REFERENCE TO RELATED APPLICATIONS

This application claims the benefit of priority from U.S. Provisional Application No. 62/292,783, filed Feb. 8, 2016, and U.S. Provisional Application No. 62/298,429, filed Feb. 22, 2016, which provisional applications are incorporated by reference herein in their entirety.

BACKGROUND

Many unmanned aerial vehicles are manually flown or flown via an autopilot in visual flight conditions. As unmanned aerial vehicle (UAV, also referred to as a drone) operations become more prevalent, UAVs may increasingly fly around areas including natural or man-made structures under visual flight rules. A visual flight rule can require an operator of a UAV to maintain visual contact with the UAV when the UAV is in flight. Various conditions may cause the UAV to fly out of visual line of sight of the operator.

SUMMARY

A UAV computer system may be configured to ensure the UAV is operating in visual line of sight (VLOS) with one or more ground operators navigating the UAV. The UAV may confirm that it has VLOS with a user device of a ground operator, such as a ground control station, or the UAV may ensure that the UAV does not fly behind or below a structure such that a ground operator would not be able to visually spot the UAV. The UAV computer system may be configured in such a way that UAV operation will maintain the UAV in visual line of sight of a base location.

Subject matter described in this specification can be embodied in a system, method or computer program product including the actions of navigating a UAV so that the UAV stays within visual line of sight of a ground operator.

In general, one innovative aspect of the subject described in this specification can be embodied in systems, computer readable media, and methods that include the actions of obtaining a base location of a UAV; obtaining an in-flight location of the UAV; determining that VLOS between the base location and the in-flight location is interrupted or will be interrupted; and in response to the determining, instructing the UAV to perform a contingency action.

In general, one innovative aspect of the subject matter described in this specification can be embodied in systems, computer readable media, and methods that include the actions of navigating the UAV either in an auto-pilot mode, partial auto-pilot mode or manual mode; periodically receiving global navigation satellite system (GNSS) signals; identifying a geospatial location of the UAV using the GNSS signals; determining whether the UAV is beyond VLOS of one or more user devices; and performing contingency actions including navigating the UAV to a landing location if the UAV is beyond VLOS of the one or more user devices.

In general, one innovative aspect of the subject matter described in this specification can be embodied in systems, computer readable media, and methods that include the actions of navigating the UAV either in an auto-pilot mode or manual mode; determining a base location of the UAV; periodically receiving GNSS signals; identifying a geospatial location of the UAV using the GNSS signals; determining whether the UAV is beyond VLOS of the base location; and navigating the UAV to a landing location.

The details of one or more embodiments of the subject matter of this specification are set forth in the accompanying drawings and the description below. Other features, aspects and advantages of the subject matter will become apparent from the description, the drawings, and from the claims.

BRIEF DESCRIPTION OF THE DRAWINGS

FIG. 6 is a flowchart of an example process for navigating a UAV within visual line of sight from a base location.

FIG. 7 is a flowchart of an example process for navigating a UAV within visual line of sight from a base location.

DETAILED DESCRIPTION

Figure 1:
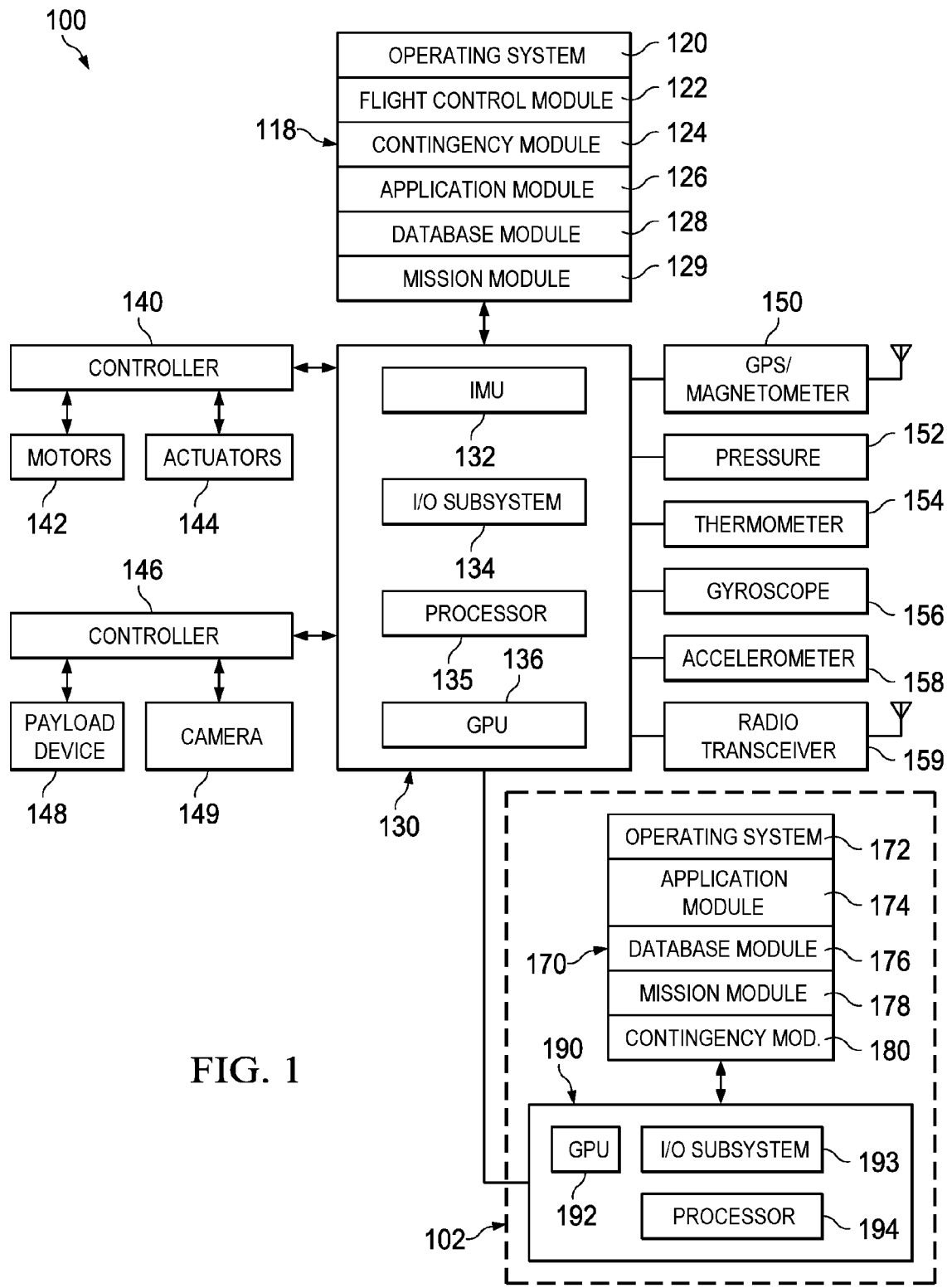
FIG. 1 is a block diagram of an example flight control system architecture for an unmanned aerial vehicle (UAV).

FIG. 1 is a block diagram of an example Unmanned Aerial Vehicle (UAV) architecture for implementing the features and processes described herein. A UAV can include a primary computer system 100 and a secondary computer system 102. The UAV primary computer system 100 can be a system of one or more computers, or software executing on a system of one or more computers, which is in communication with, or maintains, one or more databases. The UAV primary computer system 100 can include a processing subsystem 130 including one or more processors 135, graphics processing units 136, I/O subsystem 134, and an inertial measurement unit (IMU) 132. In addition, the UAV primary computer system 100 can include logic circuits, analog circuits, associated volatile and/or non-volatile memory, associated input/output data ports, power ports, etc., and include one or more software processes executing on one or more processors or computers. The UAV primary computer system 100 can include memory 118. Memory 118 may include non-volatile memory, such as one or more magnetic disk storage devices, solid-state hard drives, or flash memory. Other volatile memory such as RAM, DRAM, SRAM may be used for temporary storage of data while the UAV is operational. Databases may store information describing UAV flight operations, flight plans, contingency events, geofence information, component information and other information.

The UAV primary computer system 100 may be coupled to one or more sensors, such as GNSS receivers 150 (e.g., GPS receivers), thermometer 154, gyroscopes 156, accelerometers 158, pressure sensors (static or differential) 152, current sensors, voltage sensors, magnetometers, hydrometers, and motor sensors. The UAV may use IMU 132 in inertial navigation of the UAV. Sensors can be coupled to the UAV primary computer system 100, or to controller boards coupled to the UAV primary computer system 100. One or more communication buses, such as a controller area network (CAN) bus, or signal lines, may couple the various sensor and components.

Various sensors, devices, firmware and other systems may be interconnected to support multiple functions and operations of the UAV. For example, the UAV primary computer system 100 may use various sensors to determine the UAV's current geo-spatial position, attitude, altitude, velocity, direction, pitch, roll, yaw and/or airspeed and to pilot the UAV along a specified flight path and/or to a specified location and/or to control the UAV's attitude, velocity, altitude, and/or airspeed (optionally even when not navigating the UAV along a specific flight path or to a specific location).

The flight control module 122 handles flight control operations of the UAV. The module interacts with one or more controllers 140 that control operation of motors 142 and/or actuators 144. For example, the motors may be used for rotation of propellers, and the actuators may be used for flight surface control such as ailerons, rudders, flaps, landing gear and parachute deployment.

The contingency module 124 monitors and handles contingency events. For example, the contingency module 124 may detect that the UAV has crossed a boundary of a geofence, and then instruct the flight control module 122 to return to a predetermined landing location. The contingency module 124 may detect that the UAV has flown or is flying out of a VLOS from a ground operator, and instruct the flight control module 122 to perform a contingency action, e.g., to land at a landing location. Other contingency criteria may be the detection of a low battery or fuel state, a malfunction of an onboard sensor or motor, or a deviation from the flight plan. The foregoing is not meant to be limiting, as other contingency events may be detected. In some instances, if equipped on the UAV, a parachute may be deployed if the motors or actuators fail.

The mission module 129 processes the flight plan, waypoints, and other associated information with the flight plan as provided to the UAV in a flight package. The mission module 129 works in conjunction with the flight control module 122. For example, the mission module may send information concerning the flight plan to the flight control module 122, for example waypoints (e.g., latitude, longitude and altitude), flight velocity, so that the flight control module 122 can autopilot the UAV.

The UAV may have various devices connected to the UAV for performing a variety of tasks, such as data collection. For example, the UAV may carry a camera 149, which can be, for example, a still image camera, a video camera, an infrared camera, or a multispectral camera. In addition, the UAV may carry a Lidar, radio transceiver, sonar, and traffic collision avoidance system (TCAS). Data collected by the devices may be stored on the device collecting the data, or the data may be stored on non-volatile memory 118 of the UAV primary computer system 100.

The UAV primary computer system 100 may be coupled to various radios, e.g., transceivers 159 for manual control of the UAV, and for wireless or wired data transmission to and from the UAV primary computer system 100, and optionally a UAV secondary computer system 102. The UAV may use one or more communications subsystems, such as a wireless communication or wired subsystem, to facilitate communication to and from the UAV. Wireless communication subsystems may include radio transceivers, infrared, optical ultrasonic and electromagnetic devices. Wired communication systems may include ports such as Ethernet ports, USB ports, serial ports, or other types of port to establish a wired connection to the UAV with other devices, such as a ground control station (GCS), flight planning system (FPS), or other devices, for example a mobile phone, tablet, personal computer, display monitor, other network-enabled devices. The UAV may use a lightweight tethered wire to a GCS for communication with the UAV. The tethered wire may be affixed to the UAV, for example via a magnetic coupler.

Flight data logs may be generated by reading various information from the UAV sensors and operating system 120 and storing the information in computer-readable media (e.g., non-volatile memory 118). The data logs may include a combination of various data, such as time, altitude, heading, ambient temperature, processor temperatures, pressure, battery level, fuel level, absolute or relative position, position coordinates (e.g., GPS coordinates), pitch, roll, yaw, ground speed, humidity level, velocity, acceleration, and contingency information. The foregoing is not meant to be limiting, and other data may be captured and stored in the flight data logs. The flight data logs may be stored on a removable medium. The medium can be installed on the ground control system or onboard the UAV. The data logs may be wirelessly transmitted to the ground control system or to the FPS.

Modules, programs or instructions for performing flight operations, contingency maneuvers, and other functions may be performed with operating system 120. In some implementations, the operating system 120 can be a real time operating system (RTOS), UNIX, LINUX, OS X, WINDOWS, ANDROID or other operating system 120. Additionally, other software modules and applications may run on the operating system 120, such as a flight control module 122, contingency module 124, application module 126, database module 128 and mission module 129. Typically, flight critical functions will be performed using the UAV primary computer system 100. Operating system 120 may include instructions for handling basic system services and for performing hardware dependent tasks.

In addition to the UAV primary computer system 100, the secondary computer system 102 may be used to run another operating system 172 to perform other functions. The UAV secondary computer system 102 can be a system of one or more computers, or software executing on a system of one or more computers, which is in communication with, or maintains, one or more databases. The UAV secondary computer system 102 can include a processing subsystem 190 of one or more processors 194, GPU 192, and I/O subsystem 193. The UAV secondary computer system 102 can include logic circuits, analog circuits, associated volatile and/or non-volatile memory, associated input/output data ports, power ports, etc., and include one or more software processes executing on one or more processors or computers. The UAV secondary computer system 102 can include memory 170. Memory 170 may include non-volatile memory, such as one or more magnetic disk storage devices, solid-state hard drives, flash memory. Other volatile memory such a RAM, DRAM, SRAM may be used for storage of data while the UAV is operational.

Ideally, modules, applications and other functions running on the secondary computer system 102 will be non-critical functions in nature. If the function fails, the UAV will still be able to safely operate. The UAV secondary computer system 102 can include operating system 172. In some implementations, the operating system 172 can be based on real time operating system (RTOS), UNIX, LINUX, OS X, WINDOWS, ANDROID or other operating system. Additionally, other software modules and applications may run on the operating system 172, such as an application module 174, database module 176, mission module 178 and contingency module 180. Operating system 172 may include instructions for handling basic system services and for performing hardware dependent tasks.

The UAV can include controllers 146. Controllers 146 may be used to interact with and operate a payload device 148, and other devices such as camera 149. Camera 149 can include a still-image camera, video camera, infrared camera, multispectral camera, stereo camera pair. In addition, controllers 146 may interact with a Lidar, radio transceiver, sonar, laser ranger, altimeter, TCAS, ADS-B (Automatic dependent surveillance—broadcast) transponder. Optionally, the secondary computer system 102 may have controllers to control payload devices.

Figure 2:
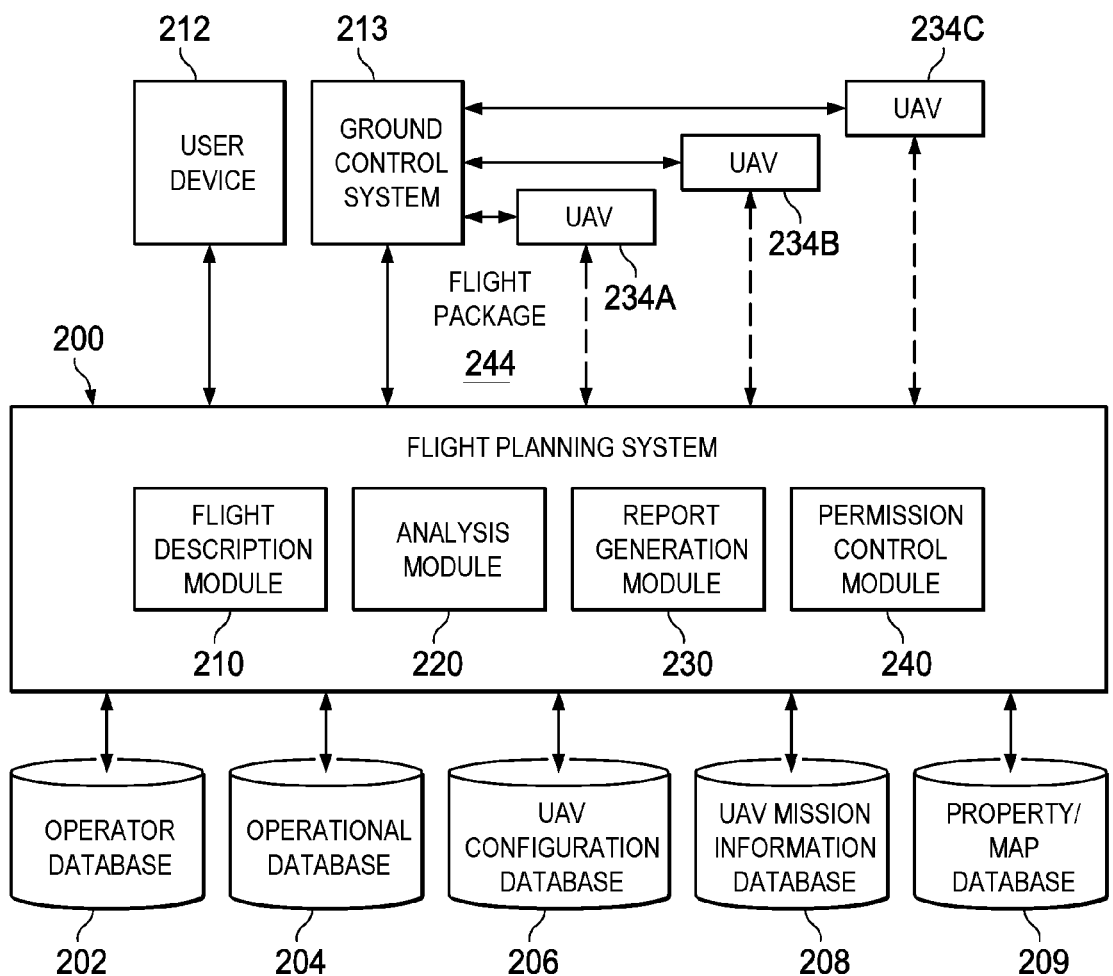
FIG. 2 is a block diagram illustrating an example flight planning system.

FIG. 2 is a block diagram illustrating an example FPS 200. The various illustrated components may communicate over wired and/or wireless communication channels (e.g., networks, peripheral buses, etc.). FPS 200 can be a system of one or more computer processors, or software executing on a system of one or more computers. The FPS 200 can maintain and communicate with one or more databases (e.g., databases 202-209) storing information describing prior implemented flight plans and information associated with each flight plan (e.g., information describing a UAV, an operator, property/map, mission, database, and so on). The databases can include operator database 202, operational database 204, UAV configuration database 206, UAV mission information database 208 and property and map database 209.

The FPS 200 can be a system of one or more processors, graphics processors, logic circuits, analog circuits, associated volatile and/or non-volatile memory, associated input/output data ports, power ports, etc., and include one or more software processes executing on one or more processors or computers. The FPS 200 can be a component of, or be coupled to, one or more user devices 212 or a GCS 213. A user device 212 can be a device including one or more processors and configured to send data to and receive data from one or more UAVs 234A, 234B and 234C. A GCS 213 can be a specialized user device 212 configured to control one or more aspects of a flight of UAVs 234A, 234B and 234C.

The FPS 200 may store, and maintain, flight operation information associated with a UAV. Flight operation information may include configuration information of each UAV, flight mission and planned flight path, operator information, the UAV's precise three-dimensional (3D) location in space, velocity information, UAV status (e.g., health of components included in the UAV), contingency plans, and so on. The FPS 200 can receive (e.g., from an operator), and determine, information describing a flight plan. The FPS 200 can provide a flight package 244 associated with the flight plan to a UAV (e.g., UAV 234A, 234B, 234C) to implement. Additionally, the FPS 200 can store flight plan information, flight data log information, job information in the various databases.

The example FPS 200 includes a flight description module 210 that can generate interactive user interfaces (e.g., HTML or XML content for web pages) for rendering on a user device (e.g., user device 212). The interactive user interfaces may optionally be transmitted for display to the user device via a wireless network or other communication channel. User device 212 can receive, from an operator, information describing a flight plan to be performed (e.g., by UAV 234A, 234B, or 234C).

To describe one or more locations where the flight plan is to be conducted, a user interface may be configured to receive, from an operator, location information associated with the flight plan (e.g., an address of a home or property, geospatial coordinates of a structure to be inspected, and so on). The flight description module 210 can obtain information describing the location. For instance, the information can include property boundaries associated with an address (e.g., boundaries of a home, obtained from a database, or system that stores or configured to access property boundary information), obstacles associated with the location (e.g., nearby trees, electrical towers, telephone poles) and/or other information. Additionally, the flight description module 210 can obtain imagery, such as geo-rectified imagery (e.g., satellite imagery), associated with the entered location information. The flight description module 210 can include some or all of the information describing the location (e.g., the obtained imagery or boundary information) in an interactive user interface to be presented on the user device 212 to an operator.

The operator of the user device 212 may interact with user interfaces to describe a flight boundary geofence (as described further below) for a UAV to enforce. For instance, the user device 212 can receive imagery associated with operator-entered location information, and present one or more geofence shapes layered on the imagery. The user interface provides functionality for the operator to select a presented shape (e.g., a polygon), and further provides functionality enabling the operator to drag and/or drop the shape to surround an area of interest in the received imagery to limit allowable locations of a UAV to locations within the shape. Optionally, the user interface may allow the user device 212 to receive input (e.g., of a finger or stylus) tracing a particular shape onto a touch-screen display of the user device 212. The flight description module 210 can store information describing the trace as a flight boundary geofence. Accordingly, the user device 212 can provide information describing the traced shape to the flight description module 210 (e.g., coordinates associated with the imagery). The flight description module 210 can correlate the traced shape to location information in the real world as illustrated by the imagery (e.g., geospatial coordinates that correspond to the traced shape).

Similarly, a user interface can enable the operator to describe safe locations for a UAV to begin the flight plan (e.g., a launching location where the UAV takes off from the ground) and end the flight plan (e.g., a landing location where the UAV lands). As an example, the flight description module 210 can analyze the obtained imagery associated with the entered location information, and identify a geometric center of a convex area (e.g., a biggest convex area) within the geofence boundary that does not include obstructions (e.g., trees). For example, the flight description module 210 can determine an open area, such as an open pasture. Similarly, the flight description module 210 can obtain topographical information associated with the entered location information, and can detect substantially flat areas (e.g., areas with less than a threshold of variance in height). For instance, the flight description module 210 can determine that an open space (e.g., an open clearing that is substantially flat) is a safe launching location for the UAV to take-off from, and can provide information recommending the open space in an interactive user interface presented on the user device 212. Additionally, the flight description module 210 can analyze the obtained imagery and locate physical features that are generally known to be safe locations for take-off and landing. For example, the flight description module 210 can determine that a driveway of a home associated with the flight plan is a safe, and can select the driveway as a safe launching and landing location, or can recommend the driveway as a safe launching and landing location.

The flight description module 210 can receive (e.g., from a user interface) survey or flight mission information via a flight package, for instance information indicating a particular type of survey for a UAV to perform (e.g., damage inspection, inspection of a vertical structure, or inspection of a rooftop). The flight description module 210 can receive waypoints for the UAV to travel to, including an order in which the waypoints are to be traveled to, a ranking or importance of each, or a group of, waypoints, and specific actions for the UAV to take while traveling to, or after reaching, each waypoint. For instance, a user interface can optionally enable the operator using the user device 212 to specify that upon reaching a particular waypoint, the UAV is to activate a particular sensor, or other payload devices, such as an infrared camera, a sensor measuring radiation, and so on. Additionally, a user interface can optionally enable the operator to specify transition speeds the UAV is to use when travelling between waypoints, or between particular waypoints.

In addition to the navigation of the UAV to the waypoints, operations to be performed at a particular location, or waypoint, may be identified by an operator using the FPS 200 or GCS 213 via a user interface. The user interface can allow an operator to photographically inspect a specified location. Operations of the UAV may be automatically configured by either the FPS 200 or GCS 213 depending on the type of inspection to be performed.

The flight description module 210 can receive information describing, or relevant to, configuration information of a UAV, such as a type of UAV (e.g., fixed-wing, single rotor, multi-rotor, and so on). In addition, the flight description module 210 can receive information describing, or relevant to, configuration information of sensors or other payload devices required for the survey or flight mission information, and general functionality to be performed. The flight description module 210 can then determine recommendations of particular UAVs (e.g., UAVs available to perform the flight plan) that comport with the received information. Similarly, the flight description module 210 can determine that, based on the received survey type, a UAV will require particular configuration information, and recommend the configuration information to the operator. For instance, the flight description module 210 can receive information identifying that hail damage is expected, or is to be looked for, and can determine that a UAV that includes particular sensors, and specific visual classifiers to identify hail damage, is needed. For example, the flight description module 210 can determine that a heat and/or thermal imaging sensor that includes specific visual classifiers that can distinguish hail damage from other types of damage (e.g., wind damage, rain damage, and so on) is needed.

The flight description module 210 can utilize received survey or flight mission information to determine a flight pattern for a UAV to follow. For instance, the flight description module 210 can determine a path for the UAV to follow between each waypoint (e.g., ensuring that the UAV remains in the geofence boundary). Additionally, the flight description module 210 can determine, or receive information indicating a safe minimum altitude for the UAV to enforce, the safe minimum altitude being an altitude at which the UAV is safe to travel between waypoints. The safe minimum altitude can be an altitude at which the UAV will not encounter obstacles within the geofence boundary (e.g., a height above buildings, trees, towers, poles and so on). Similarly, the safe minimum altitude can be based on a ground sampling distance (GSD) indicating a minimum resolution that will be required from imagery obtained by the UAV while implementing the flight plan (e.g., based in part on capabilities of an included camera, such as sensor resolution, sensor size, and so on).

The flight description module 210 can receive a time that the flight plan is to be performed (e.g., a particular day, a particular time at a particular day, a range of times, and so on). The flight description module 210 can then determine an availability of UAVs and/or operators at the received time(s). For example, the flight description module 210 can obtain scheduling information. Additionally, the flight description module 210 can filter available UAVs according to determined configuration information (e.g., as described above). Optionally, the flight description module 210 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better imagery by maximizing image contrast and minimizing the effects of shadows). The flight description module 210 can determine the flight plan accordingly.

The FPS 200 can provide the determined flight plan as a flight package 244 directly to a UAV (e.g., the UAV 234A, 234B or 234C). Optionally, the FPS 200 can provide the flight package 244 to a user device 212 or GCS 213. The user device 212 or GCS 213 can modify the flight plan or preserve the flight plan in the flight package 244 as received. The user device 212 or GCS 213 can transmit the flight package 244 to the UAV 234A, 234B or 234C. Optionally, the flight package 244 can include a flight manifest file (e.g., an XML file) identifying necessary application and version information to conduct the flight plan. For instance, the UAV can be required to execute a particular application (e.g., "app" downloaded from an electronic application store) that provides functionality necessary to conduct the flight plan. As an example, an application can effect a flight plan associated with inspecting vertical structures, and the UAV can be required to execute the application prior to initiation of the flight plan.

In particular, the FPS 200 may create a flight plan for automated or partially automated flight of a UAV, taking into consideration structural data to avoid situations where the UAV may fly out of VLOS of a base location. The base location can include one or more locations of an operator of a UAV. In some implementations, the base location can be a geospatial position of the user device 212 or a launching location of the UAV.

The FPS 200 may receive, via a user interface, a location for an aerial survey to be conducted by an unmanned aerial vehicle. One or more images may be displayed depicting a view of the location. The interface allows for a selection of a launching location of the UAV. As the images have associated geospatial positions, the FPS 200 can determine an associated latitude/longitude for the launching location. The user interface may receive an input or selections for one or more flight waypoints. Similar to the launching locations, the flight waypoints having an associated geospatial position. The FPS 200 may assign altitudes for the flight waypoints, or altitudes for the flight waypoints may be determined by a user, and specific numeric altitudes values may be set.

The FPS 200 may determine based on the launching location and altitude of the one or more flight waypoints whether a flight waypoint may cause a non-VLOS occurrence. From the launching location, a flight plan may be generated using waypoints having an associated latitude and longitude coordinates, and an associated altitude. The FPS 200 may not allow a UAV waypoint where the VLOS from the base location (e.g., the launching location, or an area around the launching location), upon determining that the waypoint would be blocked because of a structure. The FPS 200 may use 3D polygonal data, topographical data or other structure data in generating the flight plan. The system can use a 3D coordinate system to determine, based on a base location and each waypoint location, whether the UAV would likely enter into a non-VLOS situation. The flight planning system 200 can then generate flight plan that avoids the non-VLOS situation, and including only the flight waypoints that would not cause a non-VLOS occurrence.

The flight planning system 200 may present, via an interface, one or more recommended launching locations for the UAV that provides an operator an ideal location to obtain a best or maximum VLOS when operating the UAV around a structure. Lines from multiple points on the flight path, for example from each waypoint, at the flight path altitude can be computed and projected to various point locations on the ground. Point locations on the ground where the lines from the points on the flight path that do not intersect the structure may be identified as an ideal location for the operator with VLOS vantage point, making the location suitable as a launching location. A recommended launching location may be selected by the user, and the launching location is used as part of a primary flight plan. Additionally, a backup launching location with a secondary (an alternative) flight plan may be created. There may be situations when arriving at a survey site, that a physical inspection proves that the launching location of the primary flight plan is unsuitable. For example, foliage, trees, plants, new structures, etc. not shown in an aerial image used to plan the survey may now be present. These plants and structures may block the UAV from safely ascending to an inspection altitude. While at the inspection site, the operator of the GCS 213 may then select the secondary flight plan and launching location to conduct the inspection. Both the primary flight plan, and the secondary flight plans with the alternative launching locations may be transmitted by the flight planning system 200 to the GCS 213 or directly to a UAV. While the FPS 200 is configured to perform operations described for determining a launching location to provide ideal VLOS, the user device 212 or GCS 213 may also perform the operations described for selecting a launching location and waypoints to provide VLOS while operating a UAV.

Additionally, the FPS 200 may determine a geofence boundary to limit flight of the UAV to a bounded area. The user interface may display the geofence boundary over one or more location images. Additionally, the FPS 200 may determine a survey area, and set the survey area within the geofence boundary.

The FPS 200 then receives, from a GCS 213 (or directly from the UAV), flight log data and collected sensor data after the UAV has conducted the flight plan. A user interface of the FPS 200 then displays at least a portion of sensor data collected by the UAV, and information associated with the flight data package.

Similar to the FPS 200, the GCS 213 may also be used for flight and contingency planning. The GCS 213 can receive flight plans from the FPS 200 for transmission to the UAV. The GCS 213 also allows for manual override of a UAV operating in an autopilot mode. A flight plan may be transmitted to the UAV either via a wireless or tethered connection. Ideally, the GCS 213 is a mobile device, such a laptop, mobile phone, tablet device, with a cellular and other wireless connection for data transmission over the Internet or other network.

Each of user device 212, including specialized user device 212 designated as GCS 213, can be a system of one or more computers, or software executing on a system of one or more computers, which is in communication with, or maintains, one or more databases, e.g., databases, storing information describing UAV flight operations and components. Each of user device 212 can be a system of one or more processors, graphics processors, logic circuits, analog circuits, associated volatile and/or non-volatile memory, associated input/output data ports, power ports, etc. Each of user device 212 can include one or more software processes executing on one or more processors or computers.

Although in one embodiment of the invention, the FPS 200 may be primarily used to create and transmit a flight package 244 to a UAV or GCS 213, the UAV or GCS 213 can initiate the request for a flight package 244 from the FPS 200. An operator may take the UAV or GCS 213 to a property location. The UAV or GCS 213 may then request a flight package, or an updated flight package using a current position of the UAV or GCS 213. For example, the UAV or GCS 213 can determine its geospatial position via a GNSS receiver (using GPS, GLONASS, Galileo or Beidou system). The UAV or GCS 213 can then transmit its location to the FPS 200, along with other identifying information about the requesting device, such as its unique identifier (UID), or media access control (MAC) address, etc. The FPS 200 will receive the request, and determine if an updated or changed flight package exists by comparing the device identifier with identifiers in a database storing the new or updated flight package information. If FPS 200 finds a new or updated flight package, then the FPS 200 transmits the flight package from the FPS 200. The UAV or GCS 213 can receive the flight package. A confirmation acknowledging receipt of the flight package may then be transmitted from the UAV or GCS 213 to the FPS 200. The FPS 200 will then update a database record to indicate that the particular flight package has been received. Moreover, the UAV or GCS 213 can supply the property location, and a new job request can be sent to the FPS 200. The FPS 200 may create a new flight package for the UAV or GCS 213.

For autonomous flight of a UAV (UAV 234A, 234B, or 234C), a flight plan may be created and transmitted to the UAV. The flight plan instructs the UAV with regard to a particular flight path. A flight plan may be created using a FPS 200, or a GCS 213. A flight plan instructs the UAV where it should fly in a 3D space. The flight plan includes a series of connected waypoints that define where the UAV should fly and what actions that the UAV should complete during a particular flight. The UAV may have an autopilot flight module operating on a UAV computer system that uses the flight plan to automatically fly the UAV. The flight plan information may be provided to the GCS 213 and then to the UAV or directly to the UAV, in a flight package 244 comprising the flight plan and other information (such as contingency event instructions).

Using the FPS 200, or GCS 213, a UAV operator may select a series of geographically-based waypoints and a launching location for the UAV. Based on the waypoints, a flight plan may be constructed allowing the UAV to autonomously navigate itself. In some implementations, the FPS 200 or GCS 213 may automatically define a flight plan based on various criteria, such as an inspection type.

While the UAV computer system autopilot module is navigating the UAV according to a flight plan, certain aspects of the flight pattern may be controlled by the operator's user device 212. The flight plan or pattern may be configured such that for a particular waypoint, a vertical ascent/descent rate, UAV altitude, horizontal UAV rotation, payload gimbal, payload direction, waypoint transition speed, or trigger of a payload sensor may be controlled by the operator. The user device 212 may have a physical control device such as a toggle or joystick, or virtual control in a user interface that allows the operator to control vertical ascent/descent rate, UAV altitude, UAV attitude, horizontal UAV rotation, payload gimbal, payload direction. The user device 212 can trigger a payload sensor while conducting the inspection. For example, the UAV may navigate via autopilot to a position over an inspection location. An operator then can provide input to the user device 212. The user device may transmit a signal or information corresponding to the user input to the UAV via radio communication. The signal or information can control the vertical ascent/descent rate, UAV altitude, UAV attitude, horizontal UAV rotation, payload gimbal, or payload direction, or waypoint transition speed. The signal or information to can trigger a payload sensor to turn on or turn off. This particular mode allows for partial autopilot control and partial or complete manual control of the UAV. Even though the operator may manually control certain aspects of the flight plan, if one has been set, the UAV can remain within a geofence boundary envelope and to remain within VLOS of the operator operating user device 212.

In another example, the UAV may be partially manually controlled by an operator using the user device 212 while the UAV is in autopilot mode. The UAV may receive a command from the user device 212 to nudge the UAV in a particular direction. In this case, the control input of the user device 212 causes the user device 212 to send a command to the UAV, instructing the UAV to move slightly, for example between 0.1 to 3 meters, in a particular direction (in an x, y, or z axis, or diagonally). The particular distance can be predetermined, or be variable based on the proximity to a structure. Nudging the UAV allows the operator to move the UAV away from the structure if the operator sees that the UAV flying too close to the structure. The nudge command may be provided any time to the UAV while it is operating in an auto-piloted mode. The UAV should still enforce geofence boundaries (if one has been set) and not allow a nudge to cause the UAV to move beyond a geofence boundary envelope.

The FPS 200 can include an analysis module 220, a report generation module 230 and a permission control module 240. The analysis module 220 is configured to analyze a flight plan and determine whether a flight path include any sections where a UAV is out of VLOS from a base location, and provides alerts to warn such possible VLOS occurrence. The report generation module 230 is configured to generate one or more flight reports. The flight reports can include flight data (e.g., path, duration and actions of control surfaces), sensor data (e.g., air pressure, temperature and humidity), and payload data (e.g., information gathered by a payload camera). The permission control module 240 is configured to impose one or more limits on flights of the UAV. The limits can include, for example, that the UAV shall stay inside or outside an envelope defined by geofences or by geographic coordinates, or that the UAV shall stay within VLOS of a base location (e.g., a location of user device 212).

Figure 3:
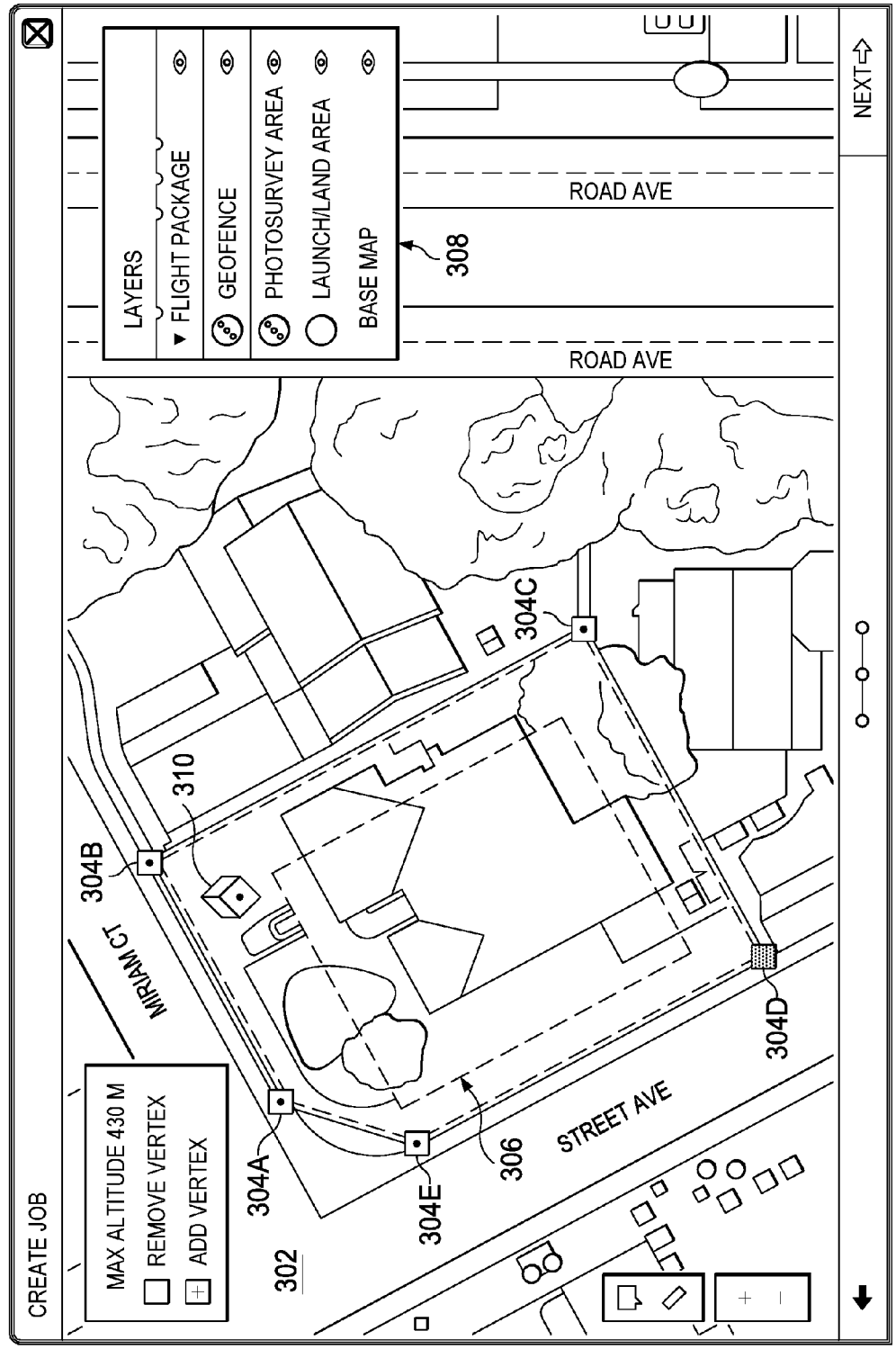
FIG. 3 illustrates an example user interface for determining a flight boundary geofence.

FIG. 3 illustrates an example user interface 300 for determining a geofence boundary. The user interface 300 is an example of an interactive user interface, generated by a system (e.g., the FPS 200, or a presentation system in communication with the FPS 200) that is configured to receive user inputs, access one or more databases, and update the user interface 300 in response to received user inputs. The user interface 300 can include a document (e.g., an interactive document such as a web page), presented on a user device (e.g., a desktop, laptop, or tablet computer, a smartphone, or a wearable device, etc.).

The user interface 300 includes image 302 (e.g., satellite imagery as depicted) of a location entered by the user of the user interface 300. The image 302 included in the user interface 300 can be interactive. A user can zoom in and out of the image 302 to target a greater or smaller real-world area. For instance, the user can interact with a zoom control, or the user can utilize a touch surface (e.g., a touch screen) to zoom in and out (e.g., the user can pinch to zoom).

The user interface 300 enables the user to select areas on the image 302 that are defined by a user-specified shape. For example, the user interface 300 can receive a user selection of particular vertices that define the illustrated polygon (e.g., vertices 304A-E). The system can shade, or otherwise highlight, the internal portion of the user-specified shape. Additionally, the user interface 300 enables the user to select a particular vertex of the illustrated polygon (e.g., vertex 304A), and drag the shape into existence by moving a finger or stylus on a touch sensitive screen of the user device.

The user interface 300 can receive input for generating a flight path 306 for the UAV to include a launching and landing location 310. The user interface 300 may include a menu 308 for creating different representative layers of a flight plan. For example, menu 308 shows a flight plan specifying a geofence, a photo survey area, a launch/land area, and a base map. The menu 308 includes a geofence menu item that refers to the geofence as represented by the connected vertices 304A-304E. The menu 308 includes a photo survey area menu item representing the flight path 306. The menu 308 includes a launch/land area menu item representing the launching/landing locations 310. The menu 308 includes a base map menu item that represents the base image layer, which includes image 302.

As illustrated in FIG. 3, the image 302 includes a highlighted area that defines a geofence boundary to be enforced by a UAV when implementing a flight plan. Different types of geofences may be used by the UAV during flight operations. A geofence can include a two-dimensional (2D) or 3D location-based boundary. A geofence can be understood as a virtual boundary for a geographic location or a virtual surface around a geographic location in a 3D space. The geofence boundary can be represented on a map as one or more polygonal or rounded shapes, for example, a circle, rectangle, sphere, cylinder, cube, or other shapes or bodies. A geofence may also be a time-based (four-dimensional) virtual boundary where the geofence exists for a particular duration, for example, a number of hours or days, or for a specific time period, for example, from 2:00 PM to 4 PM occurring on certain days, or other periods of time. A 3D geofence may exist in a particular space above ground. A geofence may be represented by latitudinal and longitudinal connected points, or other coordinate systems. A geofence may be created such that the geofence has dynamic aspects where the geofence may increase or decrease in size based on various conditions. For UAV flight operations, geofence structures are received by the UAV and stored in non-volatile memory.

For UAV operations, different types of geofences may be created. To limit flight operations within a particular volumetric space, a 3D geofence may be created. Data representing the flight boundary geofence can be transmitted to the UAV operating system. The exemplary FPS or GCS may be used to create the geofence and transmit the geofence data structure to the UAV.

For both autonomous UAV flight operations and manually controlled flight operations, the UAV can be limited to flight within a flight boundary geofence. If for example, an operator of the UAV in a manually controlled mode attempts to maneuver the UAV outside of the flight boundary geofence, the UAV may detect a contingency condition (e.g., the UAV is about to fly outside of the geofence), and then automatically direct the UAV to return to a specified predetermined landing location. Furthermore, if the UAV is capable of hovering, such as a multi-rotor UAV, the UAV may be inhibited from moving across a flight boundary geofence, or perimeter, of the geofence, and the UAV can be set to hover and not continue past the perimeter of the geofence.

Optionally, the system can utilize property information, such as property boundaries, and automatically include a highlighted portion of the image 302 as being a possible flight boundary geofence. For instance, as illustrated in FIG. 3, portions of the flight boundary geofence defined by connected vertices 304A, 304B, 304C, 304D and 304E abut roads included in the real-world geographic area depicted in the image 302. The system can determine that the entered location information describes a particular property (e.g., an open clearing that borders the road), and can highlight the particular property. Optionally, the system can include a buffer from the property boundaries of the location to ensure that even when facing forces of nature (e.g., in a strong gust of wind), the UAV will remain within the property boundaries.

Property boundary information from a database can be used to create the flight boundary geofence to limit flight of the UAV within the property's boundary. The UAV can then be constrained for flight operations only within this geofence. The property information used to create the flight boundary geofence can be of various data types, for example, parcel polygons, vector, rasterized, shape files or other data types. For the particular property, the FPS 200 may create the flight boundary geofence based on the property shape data. The various data types ideally can have geolocation and/or coordinate information, such as latitudinal/longitudinal points for use in orienting and creating the flight boundary geofence. The geofence envelope may be identical in shape to the property boundary. Optionally, the boundary of the geofence may be reduced in size. For example, the flight boundary geofence may be reduced in size by a set distance, for example 5 meters, towards a centroid of the property. Reduction of the flight boundary geofence creates a buffer zone. The buffer zone may help avoid an unintentional flyover of an adjacent property boundary. Optionally, the FPS may display an area with parcel polygonal data. An interface of the FPS may then receive a selection of one or more parcels. The FPS then can use the selections to create one or more jobs, and multiple geofence envelopes. For the multiple parcels, the operator would go to each parcel property, and conduct multiple jobs.

Optionally, the user interface 300 can be utilized by a UAV operator to indicate waypoints to be traveled to during the flight plan. For instance, the user can select portions of the image 302 to designate as waypoints, and the user interface 300 can be updated to present selectable options associated with each waypoint. As an example, the user can designate an order that each waypoint is to be traveled to, actions the UAV is to take at the waypoint, a transition speed between each or all waypoints, and so on. The system can determine the flight boundary geofence from the waypoints, such that the geofence perimeter encompasses the waypoints. The determined flight boundary geofence can be presented to the user for review, and the user can modify the boundary by interacting with the user interface 300.

Additionally, the user interface 300 can include text provided by the user that describes the flight plan. A different user can access the user interface 300, and quickly view the determined flight boundary geofence along with text describing the flight plan. In this way, a user can quickly describe flight plan information sufficient for a UAV to implement, and other users can quickly view graphical representations of the flight plan (e.g., graphical representation of the flight boundary geofence along with textual data describing the flight plan).

Figure 4:
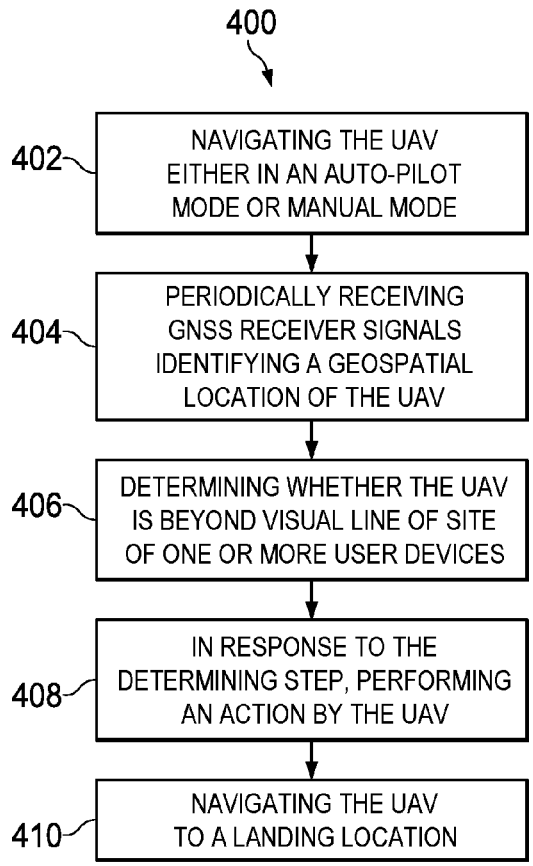
FIG. 4 is a flowchart of an example process for navigating a UAV within visual line of sight from a base location.

FIG. 4 illustrates an example process 400 of navigating a UAV within visual line of sight. In this example, a UAV computer system (e.g., UAV primary computer system 100 or UAV secondary computer system 102, both of FIG. 1) determines or predicts a non-visual line of sight occurrence in relation to a user device or ground control station. The UAV may navigate (402) in an auto-piloted mode, partially auto-piloted mode, or in a manual mode. The UAV processing system can determine an in-flight location of the UAV while the UAV is in the air. For example, the UAV computer system can periodically receive (404) a geospatial position from a location subsystem of the UAV (e.g., an onboard GNSS receiver or Wi-Fi location module) when the UAV is in the air, and designate the received geospatial position as the in-flight location. As discussed further below, the UAV processing system then determines (406) whether the UAV is about to go beyond or is beyond VLOS of one or more user devices or ground control stations. The flight trajectory of the UAV can be determined by analyzing the direction of flight of the UAV. Optionally, in response to determining a likely or actual non-VLOS occurrence, the UAV may transmit a signal or command to a user device or a GCS. The signal or command can cause the user device to present an audible or a visual alert indicating the impending or actual non-VLOS occurrence of the UAV. Optionally, in response to determining a likely or actual non-VLOS occurrence the UAV may display one or more different colored LED lights, or display a repeating visual pattern of lights. As discussed further below, in response to the determining step, the UAV computer system performs (408) a contingency action. The contingency action can include a flight maneuver. As part of the contingency action, or in addition to the contingency action, the UAV can navigate (410) to a landing location. To warn the operator of the UAV, the user device or GCS may generate an audible alert of increasing volume as the UAV nears an actual non-VLOS occurrence.

During the course of flight, the UAV may record its flight path, for example when flying in manual mode. The UAV may periodically record its geospatial position to keep track of its flight path. If the UAV computer system determines that a likely or actual non-VLOS occurrence, then the UAV may conduct a contingency action, where the UAV will backtrack along the recorded flight path until the UAV is within visual line of sight again. In other words, the UAV may navigate along the previous flight path until the VLOS is no longer interrupted between the UAV and the base location. The UAV may backtrack to a point and hover, and wait for additional commands from a ground control station. Backtracking allows the UAV to fly a known safe path.

Similarly, if the UAV is navigating according to a flight plan via auto-pilot, and the UAV computer system determines that a likely or actual non-VLOS occurrence, then the UAV could also back-track along the known flight path, and then hover at a position where the UAV is again with VLOS. At this point, the operator could move to another location allowing better visibility for flight operations.

Figure 5:
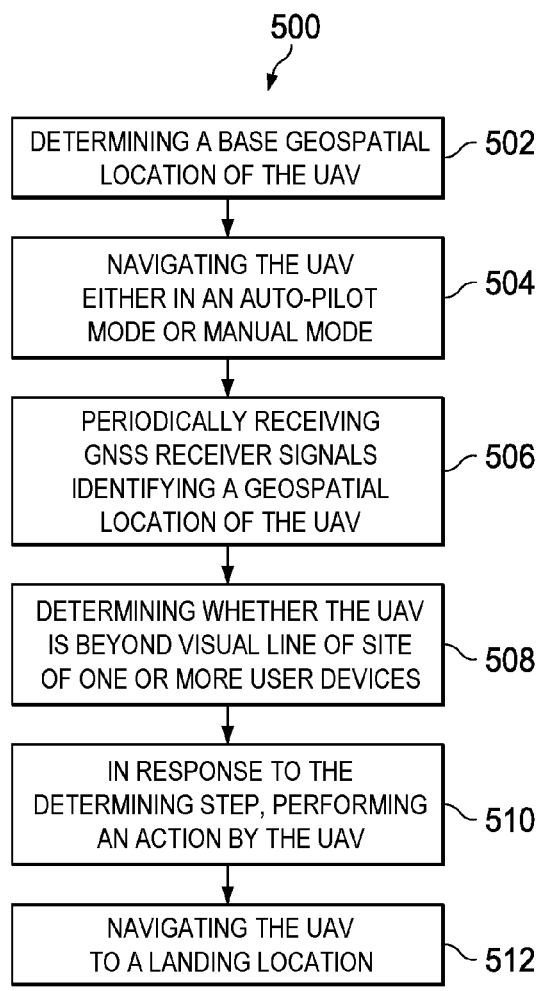
FIG. 5 is a flowchart of an example process for navigating a UAV within visual line of sight from a base location.

FIG. 5 illustrates an example process 500 of navigating a UAV within VLOS. In this example, a UAV computer system can determine a non-VLOS occurrence in relationship to an initial base geospatial location (or simply referred to as a base location). One or more processors of the UAV computer system, user device can determine (502) a base geospatial location of the UAV. For example, a user device can transmit to the UAV a geospatial position of the user device. The UAV computer system can designate the geospatial position as the base location. Alternatively, the UAV can obtain an initial geospatial position (for example, a location of the UAV when the UAV is launching), and designate the initial geospatial position as the base location. The UAV may either navigate (504) in an auto-piloted mode, partially auto-piloted mode, or in a manual mode. The UAV computer system periodically receives (506) a geospatial position from an onboard GNSS receiver when the UAV is in the air, and designates the geospatial position as an in-flight location of the UAV. As discussed further below, the UAV computer system then determines (508) whether the UAV is about to go beyond or is beyond the VLOS from the base location. In response to determining that the UAV is beyond or is about to go beyond the VLOS from the base location, the UAV computer system performs (510) a contingency action. For example, optionally, in response to determining a likely or actual non-VLOS occurrence, the UAV may transmit a signal or command to a user device triggering the user device to present an audible or visual alert indicating a non-VLOS occurrence of the UAV. Optionally, in response to determining a likely or actual non-VLOS occurrence, the UAV may display one or more different colored LED lights, or display a repeating visual pattern of lights. As discussed further below, the contingency action can include a flight maneuver. The UAV then navigates (512) to a landing location. The landing location can be the base location or a designated location for UAV recovery.

FIG. 6 illustrates an example process 600 of navigating a UAV within VLOS. In this example, a user device determines a non-visual line of sight occurrence in relationship to a received geospatial position from the UAV. The UAV may navigate (602) in an auto-piloted mode, partially auto-piloted mode, or in a manual mode. The user device obtains (604) a base location, which can be a geospatial position of the user device, a launching location where the UAV is launched, a designated location or a location of a user. The location of the user can be determined by a location aware device carried by the user. The location of the user may change during flight of the UAV. The user device periodically receives (606) in-flight locations, including geospatial positions from the UAV. The in-flight location can include latitude, longitude and altitude of the UAV as well as velocity (including speed and direction) of the UAV. As discussed further below, the UAV computer system or the user device then determines (608) whether the UAV is about to go beyond or is beyond VLOS of the user device. Optionally, in response to determining a non-VLOS occurrence, the user device may perform a contingency action, e.g., by providing (610) an audible or visual alert indicating a non-VLOS occurrence of the UAV. In response to the likely or actual non-VLOS occurrence, the user device may send a signal or command to the UAV (e.g., a contingency operation command). The command can instruct (612) the UAV to perform a flight maneuver, e.g., ascending to a higher altitude to fly above a geographic feature to regain (or maintain) VLOS with the user device.

FIG. 7 illustrates an example process 700 of navigating a UAV within visual line of sight of a user device. In this example, a user device periodically transmits a geospatial position of the user device to a UAV. The UAV may navigate (702) in an auto-piloted mode, partially auto-piloted mode, or in a manual mode. The user device periodically obtains (704) a geospatial position of the user device. The geospatial position of the user device can be designated as a base location. The user device can transmit the base location to the UAV (706). The user device receives (708) an indication that the UAV is about to fly beyond, or has actually flown beyond, VLOS of the base location. In response to receiving the indication, the user device may perform a contingency action. For example, the user device can provide (710) an audible or visual alert indicating a non-VLOS occurrence of the UAV. In response to the likely or actual non-VLOS occurrence, the user device may send a command to the UAV (e.g., a contingency operation command, or a flight maneuver command directing the UAV to ascend to a higher altitude).

Figure 8:
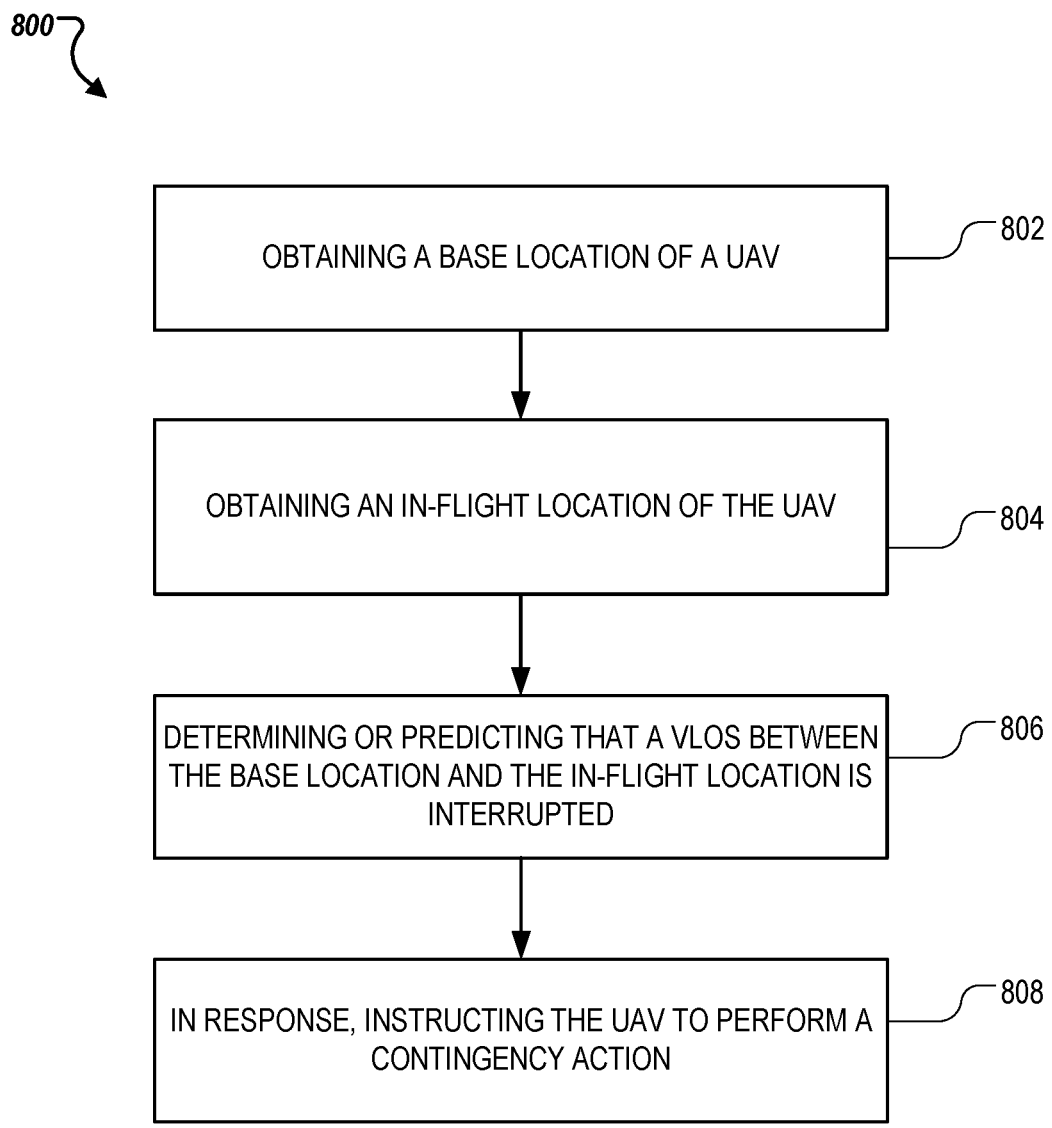
FIG. 8 is a flowchart of an example process for navigating a UAV within visual line of sight from base location.

FIG. 8 is a flowchart of an example process 800 for navigating a UAV within visual line of sight. Process 800 can be performed by one or more computer processors. The computer processors can be components of a user device or a UAV computer system. The user device can include a GCS.

The one or more processors can obtain (802) a base location of a UAV. The base location can be a launching location where the UAV took off ground, a geospatial position of the user device, or a geospatial position of an operator of the UAV. The user device can be a location-aware device equipped with, or coupled to, a location system (e.g., a GNSS processor). The user device can include a GCS. The operator of the UAV and the user device may move around during flight of the UAV. Accordingly, a base location can move. The one or more processors can track a moving base location by receiving the location of the user device periodically. In various implementations, the base location can be determined by the UAV, by the user device, or by another device providing a location (e.g., a location-aware wearable device carried by the operator of the UAV and connected to the user device by a wired or wireless connection). The base location that is using the UAV launching location can be optionally offset by a standard height, or an input of the height of the operator. Since the launch location will be at ground level, the geo-spatial base location can be increased in altitude to add the height of the operator, or an average height, for example 5 feet, 5 inches. This correction allows for a more accurate visual line of sight for the operator.

The one or more processors can obtain (804) an in-flight location of the UAV. The in-flight location of the UAV can be a geospatial position of the UAV determined by a location subsystem of the UAV when the UAV is in flight. The geospatial position of the UAV can be provided by a GNSS processor onboard the UAV. In some implementations, the one or more processors can create a point cloud of a structure, and determine the in-flight location of the UAV using the point cloud. For example, the UAV can perform a scan of geographic features while in flight, and create a point cloud of the geographic features based on the scan. The UAV can then determine an in-flight location relative to the geographic features using the point cloud.

The one or more processors can determine (806) or predict that a VLOS between the base station and the in-flight location is or will be interrupted. Determining or predicting that the VLOS between the base station and the in-flight location is or will be interrupted can be based on communication between the UAV and a user device, based on a geospatial relationship between the base location, the in-flight location and geographic features, or based on a combination of both. In various implementations, the determination or prediction can be performed on the user device or on the UAV. For example, the UAV can submit the in-flight position to a user device periodically. The one or more processors onboard the user device can make the determination or prediction based on the base location and the in-flight location received from the UAV. Likewise, the user device can submit the base location to the UAV. The one or more processors onboard the UAV can make the determination or prediction based on the in-flight location of the UAV and the received base location.

In particular, a user device can provide updates on the base location to the UAV periodically. The user device may have a GNSS-enabled receiver. The user device may periodically obtain geospatial positions of the user device. For example, an operator of the user device may stand at a particular location. The user device can obtain a first geospatial position, and provide the first geospatial position as a base location to the UAV. After launch of the UAV, the operator may move around to obtain a better vantage point to view while the UAV is in flight. The user device may periodically obtain a new geospatial position, and provide the position to the UAV as updated based location. In addition, two or more user devices may be used to spot the UAV. In such cases, the base location may include multiple geospatial positions of the multiple user devices. For example, a second ground operator (or spotter) may have a GNSS enabled user device. This second user device may obtain a geospatial position, and transmit the geospatial position to the UAV, and optionally to the first user device that is used to control the UAV. Both the geospatial position of the first user device and the geospatial position of the second user device can be designated as the base location. The one or more processors can determine that the UAV is beyond VLOS of the base location upon determining that the UAV is out of VLOS of both the first user device and the second user device.

The location of the user device as the base location can be optionally offset by a predetermined height value, or an input of the height of the operator. Since the location of the user device will be above ground level, but below eye level of the operator, the geo-spatial base location altitude of the user device can be increased in by an amount to more accurately reflect the actual visual height of the operator. This correction allows for a more accurate visual line of sight for the operator to the UAV.

In some implementations, determining or predicting that the VLOS between the base station and the in-flight location is or will be interrupted is based on communication between the UAV and a user device. The UAV can send a UAV signal (e.g., an optical signal such as visible or infrared light signal) periodically. The user device can respond with a light signal or a wireless signal acknowledging receipt of the UAV signal. The UAV may determine that the VLOS is interrupted upon determining that the UAV has not received the acknowledging signal after a threshold period of time has passed since the UAV sent the original signal. The role of the UAV and user device can be reversed. For example, the original signal may be sent by the user device. In some implementations, the one or more processors can determine or predict that the VLOS between the base location and the in-flight location is interrupted when a signal strength (RSSI) of a wireless signal received by the user device from the UAV (or by the UAV from the user device) falls below a threshold. The UAV may increase the frequency or intensity of the UAV signal based on the altitude of the UAV, or a distance above the height of a structure, or how imminent the VLOS will be interrupted. For example, the UAV can increase the frequency or intensity of the UAV signal upon determining that an interruption of the VLOS is temporally or geospatially imminent.

In another aspect to determine interruption of VLOS, optionally a UAV can include functionality to actively determine whether it is within VLOS of an operator located at the base location. For instance, the UAV can utilize cameras to actively ensure that the operator is within VLOS of the UAV. For example, the UAV can be configured to visually detect an object associated with the operator. The operator can wear an object (e.g., an object having a particular shape, color or other visual property, an object that outputs particular electromagnetic radiation, and so on). The UAV can ensure that the object is within VLOS with the UAV.

In some implementations, determining or predicting that the VLOS between the base station and the in-flight location is or will be interrupted is based on geospatial relationship between the base location and the in-flight location. The one or more processors can determine or predict the interruption using a database of three-dimensional geographic features. The database can store 3D or four-dimensional (including a time dimension) geofences. Determining or predicting that the VLOS is interrupted can include determining or predicting that the UAV has entered, or will enter, a geofence that corresponds to a geographic feature that intersects a line between the base location and the in-flight location. For example, the one or more processors can determine that the UAV has entered a geofence that corresponds to a space that is located behind a building from a viewpoint of the based location. In response, the one or more processors can determine that the VLOS is interrupted.

A 3D geofence can be utilized to force a UAV to maintain VLOS with an operator's user device. The 3D geofence can be generated based on a prior 3D map of an inspected geographic area. A processor can use a hidden surface determination or occlusion analysis to determine a location of the operator. Other methods can be utilized to maintain VLOS without a prior 3D map (e.g., the UAV or a cloud system can actively determine a 3D geofence as the UAV traverses an inspectable area). One or more 3D geofences may be used by a user device or the cloud system, and may be used by the UAV during flight.

In some implementations, the database stores a topographical map of the 3D geographic features. The one or more processors can determine a line between the base location and the in-flight location, and determine whether any of the 3D geographic features intersects that line. For example, the topographical map can indicate a respective height of each 3D feature. The one or more processors can identify features along the line between the base location and the in-flight location. The one or more processors can determine or predict that the VLOS is interrupted upon determining that an altitude of the UAV is below a height of a feature along the line.

For example, structural polygonal data can be used to determine at least a height and physical formation of one or more natural or man-made structures (e.g., hills, trees or buildings). The structural polygonal data may be downloaded by the UAV from a server. In addition, or alternatively, the UAV may creating a point-cloud using real-time Lidar (or other point measurement device such as Leddar or Sonar) observations. The point-cloud then can be used to determine where the UAV is located in a 3D space in relationship to the base location or in relationship to the structures.

In response to determining that the VLOS is interrupted, the one or more processors can instruct (808) the UAV to perform a contingency action. The contingence action can include providing a command to a controller to control at least one of a motor or actuator of the UAV to move a control surface of the UAV, where movement of the control surface causes the UAV to land at a landing location or to fly to a position that is within VLOS of a ground control station of the UAV. The contingence action can include navigating the UAV to a landing location (e.g., the base location, a pre-specified location or a nearest feasible location that is within the VLOS of the user device). The contingency action can include navigating the UAV to hold at a waypoint prior to descending. The contingency action can include navigating the UAV to ascend to a higher altitude until the UAV determines that the UAV is within VLOS of the base location. The contingency action can include logging the geospatial coordinates of the flight of the UAV, and reversing the flight of the UAV along the previous flight path using the recorded geospatial coordinates of the UAV, or flying back to previous waypoints of a flight plan. The contingency action can include reversing the flight of the UAV until the UAV reaches a point where the UAV is within VLOS of the base position. The previous examples are not meant to be limiting. Additional and alternative contingency actions are possible.

Additionally or alternatively, in response to determining that the VLOS is interrupted, the one or more processors can cause a user device to perform a contingency action. In some implementations, in response to determining that the VLOS is interrupted, the one or more processors can present an alert on a user device controlling the UAV. The alert can include an instruction of moving the user device to a new base location that is in VLOS with the UAV, or an instruction on how to manually navigate the UAV back to in VLOS of the operator. The ground control station may provide an audible or visual alert that the UAV is about to go beyond visual line of sight, or that the UAV has gone beyond visual line of sight. In response to determining a likely or actual non-VLOS occurrence the UAV also may display one or more different colored LEDs or other lights, or a repeating a visual pattern of lights.

Figure 9A:
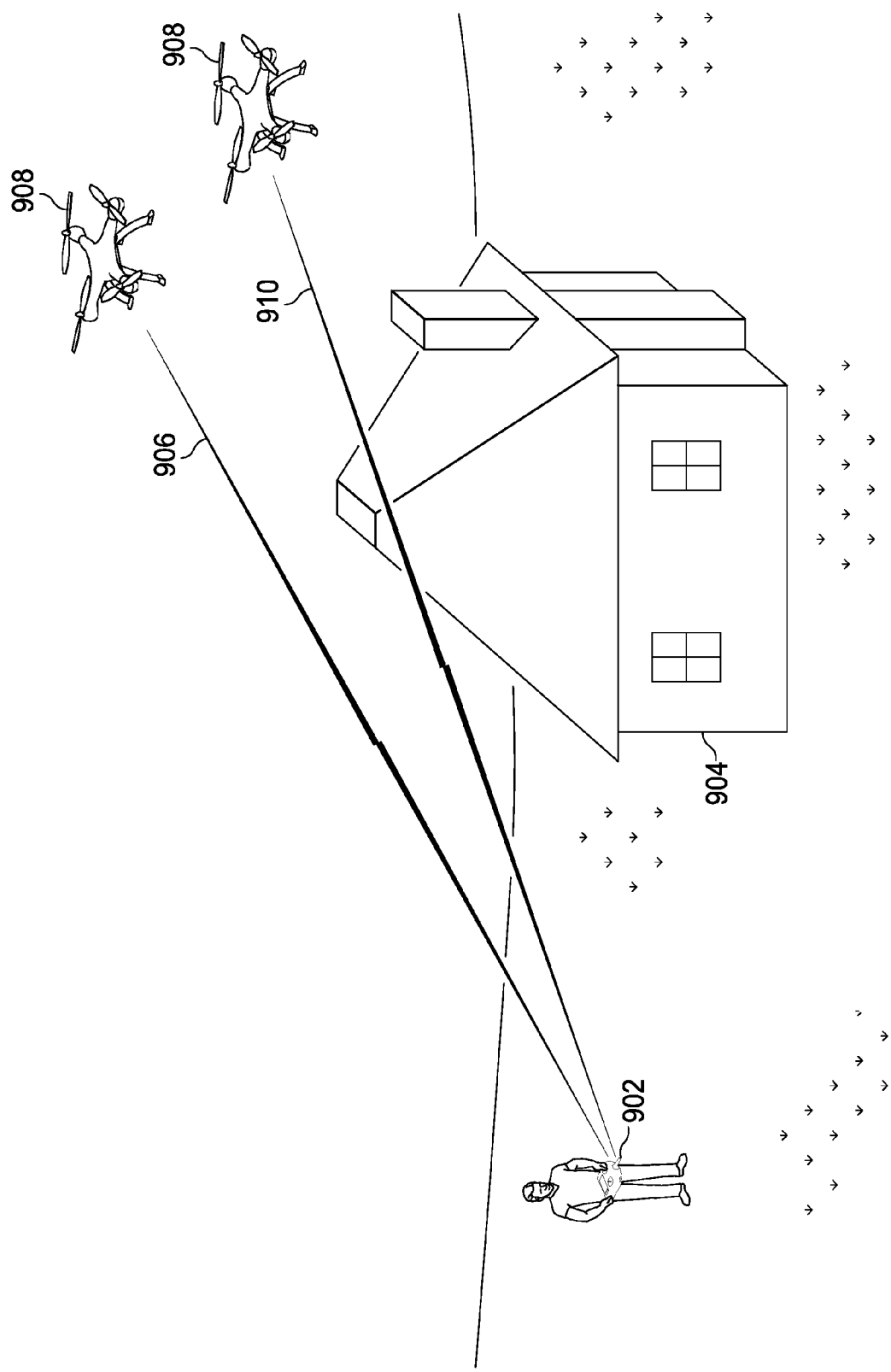
FIG. 9A illustrates example operations of maintaining a UAV within visual line of sight from a base location.

FIG. 9A illustrates example operations of maintaining a UAV 908 within visual line of sight from a base location. In the example shown, an operator controls operations of the UAV 908 using a user device 902. User device 902 can be a GCS. The operator is flying the UAV 908 around the structure 904. Line 906 represents the situation when the UAV 908 is within VLOS of the base location. In the example shown, the base location is a geospatial position of the user device 902. Line 910 represents the situation when the UAV 908 is about to go beyond, or has gone beyond VLOS of the base location. Upon determining that the UAV 908 is about to go beyond, or has gone beyond, a VLOS of the base location, a computer processor can cause the UAV 908 or the user device 902 to perform a contingency action.

For example, the computer processor can instruct the UAV 908 to land at a landing location or ascend to a higher altitude.

A database onboard UAV 908 or onboard user device 902 can store a 3D representation of structure 904. A processor can determine that line 910 is interrupted base on the base location, an in-flight location of UAV 908, and the 3D representation of structure 904. The 3D representation of structure 904 can be downloaded to the database from a server.

As discussed previously, the user device 902 or the UAV 908 may individually, or together as part of a system, determine whether the UAV 908 is about to, or has encountered, a non-VLOS condition. The user device 902 or the UAV 908 may determine that the UAV 908 is approaching a position beyond VLOS of the base location (e.g., geospatial position of the user device 902).

One or more processors of the user device 902 or the UAV 908 may use three geospatial points to determine or predict the non-VLOS occurrence. The one or more processors can use a 3D coordinate system, such as a 3D Cartesian coordinate system, cylindrical coordinate system, or spherical coordinate system to make the determination or prediction. The following will describe the use of a Cartesian coordinate system. A first point $P_1(x,y,z)$ can be a point defining a place near the ground representing the base location. The first point $P_1(x,y,z)$ can represent, for example, a geospatial position of a ground operator. Alternatively, the first point $P_1(x,y,z)$ can correspond to the geospatial position of the launching location of the UAV 908, or a location of the user device 902. The user device 902 can periodically update the base location when the operator of the user device is moving around. Geospatial data can be in a WGS-84 format and converted using the Haversine Formula. The geospatial data including altitude information can be used to determine the Cartesian coordinate points. A second point $P_2(a,b,c)$ is a point defining an in-flight location, which is a location of the UAV 908 flying in the air. A line between $P_1(x,y,z)$ and $P_2(a,b,c)$ in the Cartesian coordinate system (e.g., line 906 or line 910) can be determined. Various polygon structures, 3D geofences, or other topographical data can be used to determine if the UAV 908 is about to enter a non-VLOS condition. For example, a polygonal representation of structure 904 may be expressed in the Cartesian coordinate system. Upon determining that the line between points $P_1(x,y,z)$ and $P_2(a,b,c)$ intersects any of the polygonal representation of structures, the one or more processors can then determine that the UAV 908 is in a non-VLOS condition relative to the base location. To predict that the UAV 908 is about to enter into a non-VLOS condition, the UAV or user device 902 can calculate a particular distance between the line and each polygonal structure. Upon determining that the distance is within a threshold distance or value, the one or more processors can then predict that the UAV 908 is close to entering in a non-VLOS condition.

While $P_1(x,y,z)$ is a point, the base location can be represented by a volumetric shape, such as a cube, sphere, cylinder or other volumetric shape. Alternatively, the base location can be represented as a two-dimensional boundary around a geospatial position of the user device or a launching location of a UAV. Similarly, the in-flight location of the UAV in the air can be represented by a volumetric shape, or a 2D shape. Various formulae can be used to compare the various points of the volumetric or 2D shapes.

Figure 9B:
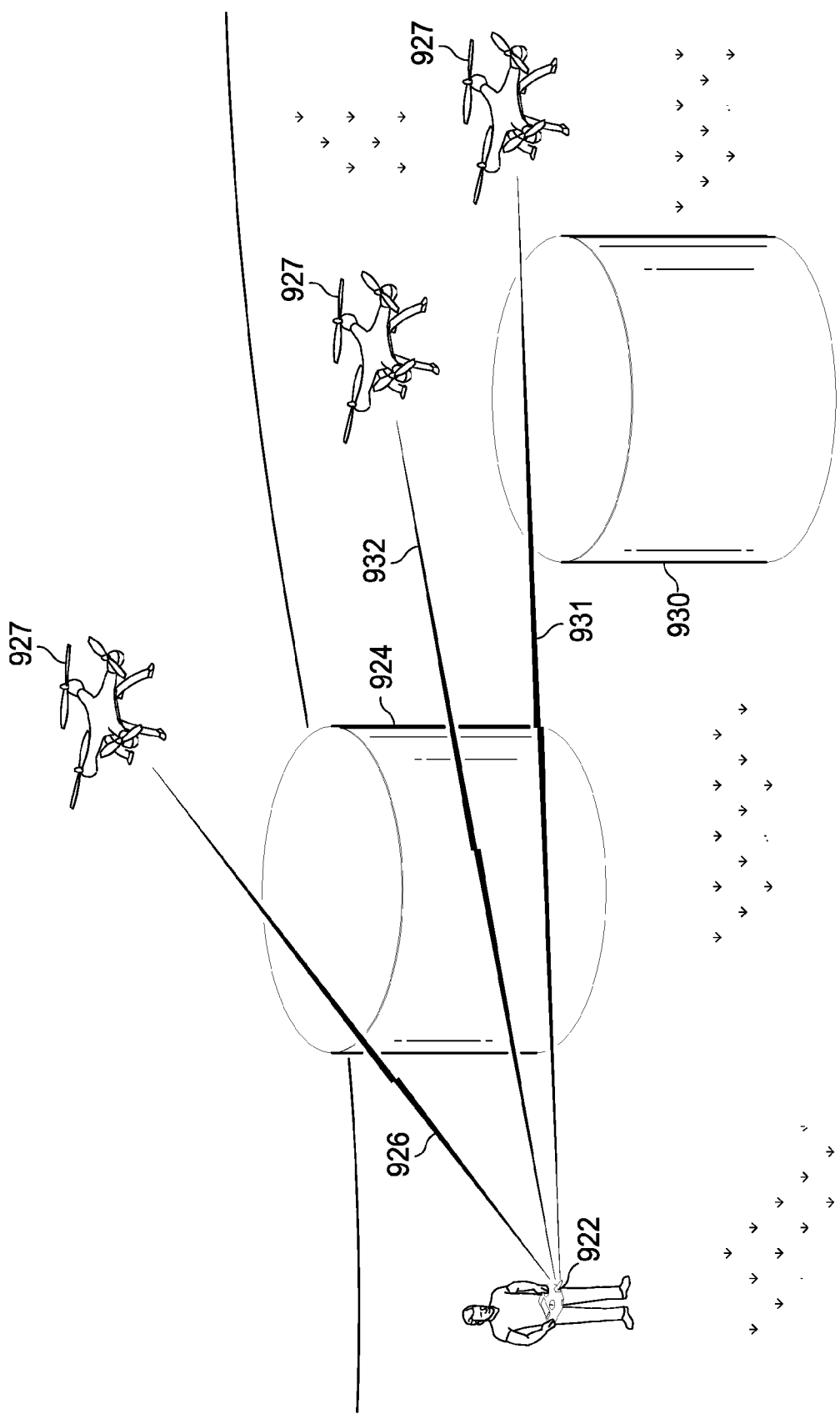
FIG. 9B illustrates example operations of maintaining a UAV within visual line of sight based on 3D geofences.

FIG. 9B illustrates example operations of maintaining a UAV within VLOS based on 3D geofences. An operator with a user device 922 is flying UAV 927 above a 3D geofence

924. User device 922 can include a GCS. Line 926 represents the situation where the UAV 927 is within VLOS of a base location, which is a geospatial position of the user device 922. Similarly, in another example, an operator with a user device 922 is flying UAV 928 above the 3D geofence 930. UAV 928 is within VLOS of the base location, as represented by line 932. Line 931 represents the UAV 928 about to go, or going beyond VLOS of the base location. Upon determining that the UAV 928 is about to go beyond, or has gone beyond VLOS of the base location, a computer processor can cause the UAV 928 or the user device 922 to perform a contingency action. For example, the computer processor can instruct the UAV 928 to slow down and land at a landing location or ascend to a higher altitude.

The UAV 928 may be prevented from flying more than a threshold distance from a signal source, e.g., the user device 922 controlling flight of the UAV 928. For example, if one or more processors of a UAV computer system determines that strength of signals from the signal source falls below a threshold value, the UAV computer system can perform a contingency action. The one or more processors of the UAV computers can direct the UAV 928 to perform a flight maneuver (such as ascended to a higher altitude) by sending a command to a controller of a motor or actuator to increase or decrease airspeed or to move a flight surface, if the determined signal strength falls below a threshold value. The signal source can be one or more of a cellular radio signal, a wireless router signal, a microwave radio signal, an FM transmitter signal, an AM transmitter signal or a Bluetooth signal. The UAV 928 may transmit a UAV signal to the user device 922 confirming that the UAV is within visual line of sight. The user device 922 may transmit a signal to the UAV 928 confirming that the UAV 928 is within VLOS of user device 922.

The UAV 928 can use an optical sensor to determine the ambient visual conditions. For example, the optical sensor can detect fog, smoke, cloud, dust or lighting conditions. The UAV 928 can determine a visibility distance based on the visual conditions. Upon determining that the visibility distance falls below a threshold value, then the UAV 928 can determine that the UAV 928 is flying in non-visual flight conditions. In response, the UAV 928 can trigger a contingency action. The UAV 928 may detect nearby clouds with various sensors, and the UAV computer system of UAV 928 may maintain the UAV 928 vertically and horizontally separated from the detected cloud by a fixed or variable distance. For example, the UAV 928 may maintain at least a horizontal and vertical distance of 500 feet from the detected cloud.

The user device 922 or the UAV 928 can receive weather updates for current weather conditions. The UAV 928, or the user device 922, may determine, based on the received weather updates, that in the local area the UAV 928 will not be able to fly under visual flight conditions. Additionally, the user device 922 or UAV 928 can determine a cloud ceiling level from the weather updates. The UAV 928 can restrict an altitude of the UAV 928 to an altitude that is lower than the ceiling by a separation distance. For example, upon determining that the cloud ceiling is 1000 feet, the UAV 928 may be restricted to flight up to 500 feet, given a separation distance of 500 feet. The separation distance from the cloud ceiling may be a fixed distance, or may be variable based on the ceiling height, where a higher cloud ceiling corresponds to a larger separation distance. For example, a 2000-foot cloud ceiling can correspond to a separation distance of 600 feet, and a 1500-foot cloud ceiling can correspond to a separation distance of 500 feet.

The processes and operations are described above in terms of a processor one or more processors. The processor or processors can be onboard a UAV, onboard a user device, or part of a cloud-based processing system. In particular, a user device can be designated as a GCS and perform functions of a GCS. A user device and a UAV computer system can be designated as a FPS and perform functions of an FPS. Likewise, functions of both the GCS and FPS can be performed by a cloud-based processing system.

While the above discussion focuses primarily on a single user device or GCS for determining a visual line of sight interruption, multiple user devices or GCS devices that may communicate with the UAV can be used to determine a visual non-line of sight occurrence. For example, a primary operator can control the UAV with a GCS, and one or more additional devices that are in communication with the UAV (or directly with the GCS) can cooperatively operate to determine if the UAV is beyond visual line of sight of each or all of the devices. So long as the UAV is determined to be within visual line of sight of at least one of the devices using the techniques described herein, then a contingency event would not be generated. For example, the UAV could receive a base location from a primary operator's GCS and a spotter's user device. The primary operator could be positioned at a location where the operator's GCS may lose visual line of sight of the UAV. However, the spotter's user device may also provide a base location to the UAV, or transmit the base location to the operator's GCS. If the visual line of sight between UAV's in-flight geo-spatial location and at least one of the devices (e.g., the user device or GCS), the UAV would be considered to be within visual line of sight, and no contingency operation would be initiated. However, if the UAV's visual line of sight for both the operator's GCS and the user device is interrupted, then a contingency operation would be conducted as described herein.

Various types of UAVs may be used to implement the inventions described herein (for example, a fixed wing airplane, helicopter, a multi-rotor vehicle (e.g., a quad-copter in single propeller and coaxial configurations), a vertical takeoff and landing vehicle, lighter than air aircraft). A multi-rotor vehicle in a coaxial configuration may use the same propeller pitch and diameter propellers, use different pitch and diameter propellers, or variable pitch propellers. In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV), can include any device that captures real-world information, including cameras, radiation measuring instruments, distance detectors such as Lidar, and so on.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smartphone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a toolbar, a pop up menu, interactive voice response system, or otherwise.

In general, the terms "engine" and "module" as used herein refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital videodisc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood within the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module or block is necessary or indispensable. The novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method, comprising:
   obtaining a base location of an unmanned aerial vehicle (UAV);
   obtaining an in-flight location of the UAV;
   determining, using a database of three-dimensional geographic features, a visual line of sight (VLOS) interruption between the base location and the in-flight location of the UAV; and
   in response to the determining, instructing the UAV to perform a contingency action, wherein the method is performed by one or more computer processors.

2. The method of claim 1, wherein the base location is a launching location where the UAV took off, or a location of a user device controlling the UAV, and the in-flight location is a location of the UAV determined by a location subsystem of the UAV.

3. The method of claim 1, wherein the database of three-dimensional geographic features stores data on one or more natural or man-made structures.

4. The method of claim 1, wherein the database stores a list of geofences having at least three dimensions, and wherein determining that the VLOS interruption comprises determining that the UAV has entered a geofence that is behind a geographic feature that intersects a line between the base location and the in-flight location.

5. The method of claim 1, wherein the database stores a topographical map of the three-dimensional features, and wherein determining that the VLOS interruption comprises determining that, according to the map, at least one of the three-dimensional features intersects a line between the base location and the in-flight location.

6. The method of claim 5, wherein the topographical map indicates a respective height of each three-dimensional feature, and determining that at least one of the three-dimensional features intersects the line between the base location and the in-flight location comprises determining that an altitude of the UAV is below a height of the three-dimensional feature.

7. The method of claim 1, wherein determining that the VLOS between the base location and the in-flight location is interrupted comprises:
   sending an optical signal from the UAV to one or more user devices; and
   determining that the signal from the one or more user devices has been interrupted.

8. The method of claim 1, wherein the contingency action comprises navigating the UAV to a landing location or navigating the UAV to ascend to an altitude that is within the VLOS of the base location.

9. The method of claim 1, wherein the contingency action comprises navigating the UAV along a previous flight path until the VLOS between the base location and the in-flight location is no longer interrupted.

10. The method of claim 1, comprising, in response to determining that the VLOS between the base location and the in-flight location of the UAV has been interrupted, presenting an alert on a user device, the alert including at least one of a visual or an audio message.

11. A system, comprising:
    one or more computer processors; and
    a non-transitory storage device storing instructions operable to cause the one or more computer processors to perform operations comprising:
       obtaining a base location of an unmanned aerial vehicle (UAV);
       obtaining an in-flight location of the UAV;
       determining, using a database of three-dimensional geographic features, that a visual line of sight (VLOS) between the base location and the in-flight location is or will be interrupted; and
       in response to the determining, causing the UAV to perform a contingency action, the contingency action including providing a command to a controller to control at least one of a motor or actuator of the UAV to move a control surface of the UAV.

12. The system of claim 11, wherein the system is a cloud-based processing system, a system onboard the UAV or a system onboard a user device controlling the UAV.

13. The system of claim 12, wherein the base location is a launching location where the UAV took off or a location of a user device controlling the UAV, and the in-flight location is a location of the UAV determined by a location subsystem of the UAV.

14. The system of claim 12, wherein the database of three-dimensional geographic features stores data on one or more natural or man-made structures.

15. The system of claim 11, wherein the database stores a list of geofences having at least three dimensions, and wherein determining that the VLOS is interrupted comprises determining that the UAV has entered a geofence that corresponds to a geographic feature that intersects a line between the base location and the in-flight location.

16. The system of claim 11, wherein the database stores a topographical map of the three-dimensional features, and wherein determining that the VLOS is interrupted comprises determining that, according to the map, at least one of the three-dimensional features intersects a line between the base location and the in-flight location.

17. The system of claim 11, wherein determining that the VLOS between the base location and the in-flight location is interrupted comprises:
   sending an optical signal from the UAV to one or more user devices; and
   determining that the signal from the one or more user devices has been interrupted.

18. The system of claim 11, wherein the contingency action comprises navigating the UAV to a landing location or navigating the UAV to ascend to an altitude that is within the VLOS of the base location.

19. The system of claim 11, wherein the contingency action comprises navigating the UAV along a previous flight path until the VLOS between the base location and the in-flight location is no longer interrupted.

20. The system of claim 11, the operations comprising, in response to determining that the VLOS between the base location and the in-flight location of the UAV is or will be interrupted, presenting an alert on a user device, the alert including at least one of a visual or an audio message.

21. A non-transitory storage device storing instructions operable to cause one or more computer processors to perform operations comprising:
   obtaining a base location of an unmanned aerial vehicle (UAV);
   obtaining an in-flight location of the UAV;
   predicting, using a database of three-dimensional geographic features, that a visual line of sight (VLOS) between the base location and the in-flight location will be interrupted; and
   in response to the predicting, causing the UAV to perform a contingency action.

22. The non-transitory storage device of claim 21, wherein obtaining an in-flight location of the UAV comprises:
   creating a point cloud of a structure; and
   determining the in-flight location of the UAV using the point cloud.

23. The non-transitory storage device of claim 21, wherein predicting that the VLOS between the base location and the in-flight location will be interrupted comprises determining a signal strength of a wireless signal between the UAV and a controller is approaching a threshold value, and the contingency action comprises preventing the UAV from flying beyond a distance from the controller such that the signal strength is above the threshold value.

24. The non-transitory storage device of claim 21, the operations comprising submitting at least one of structural polygonal data indicating heights of structures or a topographical map from a controller to the UAV, wherein predicting that the VLOS between the base location and the in-flight location will be interrupted comprises determining that the UAV is approaching a space where a geographic feature intersects the VLOS according to the structural polygonal data or topographical map.

25. The non-transitory storage device of claim 21, the contingency action including providing a command to a controller to control at least one of a motor or actuator of the UAV to move a control surface of the UAV, wherein movement of the control surface causes the UAV to land at a landing location or to fly to a position that is within VLOS of a ground control station of the UAV.

26. The non-transitory storage device of claim 21, wherein predicting that the VLOS between the base location and the in-flight location will be interrupted comprises:
   sending an optical signal from the UAV to one or more user devices; and
   determining that the optical signal from the one or more user devices has been interrupted.

27. The non-transitory storage device of claim 21, wherein the contingency action comprises navigating the UAV to a landing location or navigating the UAV to ascend to an altitude that is within the VLOS of the base location.

28. The non-transitory storage device of claim 21, wherein the contingency action comprises navigating the UAV along a previous flight path until the VLOS of the base location and the in-flight location is no longer interrupted.

29. The non-transitory storage device of claim 21, the operations comprising, in response to predicting that the VLOS between the base location and the in-flight location of the UAV will be interrupted, presenting an alert on a user device, the alert including at least one of a visual or an audio message.

* * * * *